Figures 1, 2:
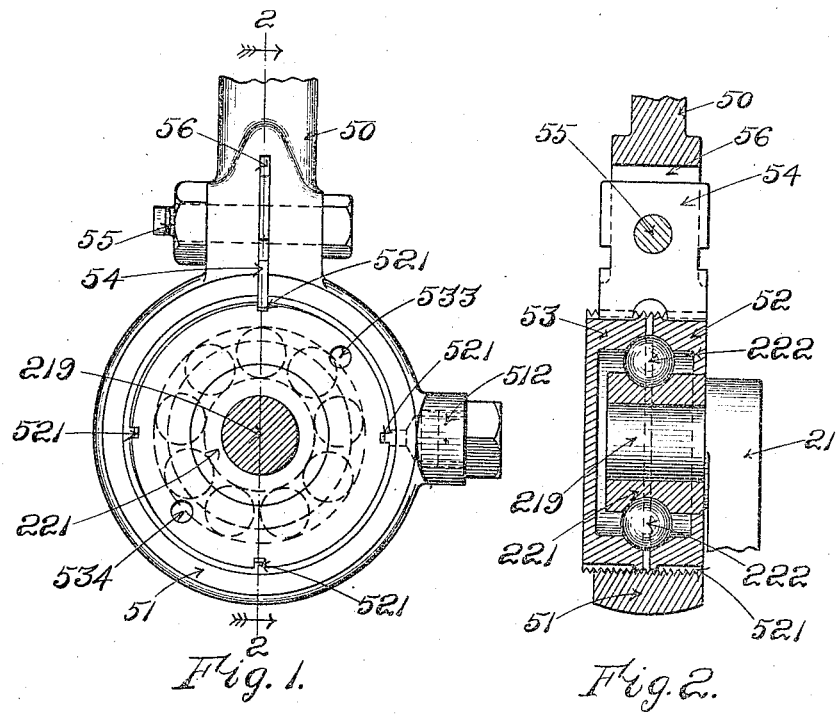

No. 856,170.  
PATENTED JUNE 4, 1907.

W. B. MASON.  
ENGINE BEARING.  
APPLICATION FILED NOV. 9, 1905.

Witnesses:  
J. Henry Parker  
Aline Tarr

Inventor.  
William B. Mason,  
by Wood, Calver, Copeland & Dike  
Attorneys.

UNITED STATES PATENT OFFICE.

WILLIAM B. MASON, OF BOSTON, MASSACHUSETTS, ASSIGNOR TO THE MASON REGULATOR COMPANY, OF SACO, MAINE, A CORPORATION OF MAINE.

ENGINE-BEARING.

No. 856,170.  Specification of Letters Patent.  Patented June 4, 1907.

Original application filed December 28, 1903, Serial No. 186,784. Divided and this application filed November 8, 1905.
Serial No. 286,404.

*To all whom it may concern:*

Be it known that I, WILLIAM B. MASON, a citizen of the United States, residing at Boston, county of Suffolk, State of Massachusetts, have invented a certain new and useful Improvement in Engine-Bearings, of which the following is a specification, reference being had therein to the accompanying drawings.

This application is a division of the application Serial No. 186,784, filed by me December 28, 1903.

My invention has for its object to provide improved ball bearings for the connecting rod and crank-pin of an engine.

It is particularly adapted for use in small high speed engines, such for instance, as those used in automobiles, where the constant vibration tends to cause the various parts to work loose.

The invention has for its more immediate object to provide a bearing which may be readily adjusted without expert mechanical knowledge, which shall be easy to lubricate and shall also be dust-proof.

In the drawings, I have shown the invention in the form in which I have employed it in a small steam engine for automobiles because that is the form in which I have put it into actual practice, but it is evident that it may be modified in many ways without departing from the spirit of my invention.

The invention will be fully understood from the following description taken together with the accompanying drawings, and the novel features thereof are pointed out and clearly defined in the claims at the close of the specification.

Figures 3, 4:
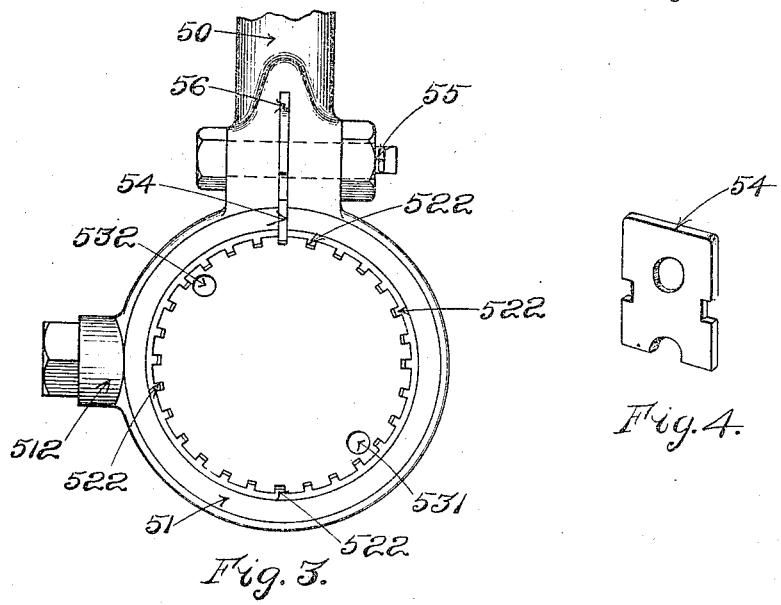

Referring to the drawings,—Figure 1 is a side elevation of the lower end of a connecting rod with the crank-pin in section. Fig. 2 is a section on line 2—2, Fig. 1. Fig. 3 is a side elevation of the opposite side of the connecting rod from that shown in Fig. 1. Fig. 4 is a perspective view of the locking plate.

In the drawings,—21 is the crank and 219 is the crank-pin upon which the connecting rod bearings rotate. Crank-pin 219 is provided with a ball-track 221 having a groove of circular cross section to correspond with the balls 222. The lower end of the connecting rod is formed into an annular bearing ring 51. The interior of this bearing ring is threaded for the reception of the two ball-cups 52 and 53 which are provided with corresponding threads on their exterior surface. The exterior ball-cup 53, that is the one upon the outside of the engine, is made as shown in Fig. 2 in such a manner that it forms a cap over the end of the crank-pin 219 and the interior parts. The outside surface of this ball-cup is provided with two holes 531 and 532, see Fig. 3, for the reception of a spanner wrench of the ordinary form by means of which the ball-cup may be rotated on its axis within the bearing ring of the connecting rod, and thereby its position with regard to the said bearing ring and the other ball-cup changed. The other ball-cup 52 is similar in construction to the before described ball-cup 53 with the exception that it has a hole at its center for the reception of the ball-track 221 fast upon the crank-pin 219. This ball-cup 52 is also provided with two holes 533, 534, for the reception of a spanner wrench in the same manner as ball-cup 53.

In the threaded peripheral surface of the ball-cups 52 and 53 are cut notches numbered 521 and 522 respectively for the reception of a locking plate 54, see Fig. 4, but in order that the dust may not enter these bearings which are not contained in any exterior casing, the said notches 521 and 522 are not cut the whole width of the peripheral surface of the ball-cups 52 and 53. I form the locking plate 54 with two legs which engage the notches in the ball-cups 52 and 53 and hold the said ball-cups firmly in position, straddling the portion of each which is not grooved. The locking plate 54 is held in place by the cap screw 55 which passes through proper holes in the lower part of the connecting rod 50. The connecting rod 50 is provided with a slot 56 cut therein for the reception of the locking plate 54. This slot 56, as will be seen from Fig. 2, is slightly longer than the whole length of the locking plate 54, so that the said locking plate may be readily inserted. As will be clearly seen from Figs. 1 and 2, the cap screw 55 cannot be passed through the hole in the locking plate 54 until the locking plate 54 has been moved downward so that its two ends have entered corresponding notches in the ball-cups 52 and 53. The locking plate 54 is conveniently inserted and removed by a pry tool such as has been described in the application of which this application is a division.

Since an exceedingly fine adjustment laterally is not required of the ball bearings of a connecting rod, I provide the interior ball-cup 52 with only four notches, 521, as will be seen from Fig. 1, but I provide the outside ball-cup 53 with a considerably greater number—some thirty or more. In this way I obtain a coarse adjustment of the bearing by the rotation of the inside ball-cup 52 and a fine adjustment of the bearing by the rotation of the outside ball-cup 53.

I provide the casing 51 of the connecting rod 50 with an opening 512 for the insertion of a grease filler.

Adjustment of my improved crank-pin bearing takes place in the following manner. The cap screw 55 is taken out and the locking plate 54 is removed by means of the pry tool. The outside ball-cup 53 is then rotated by means of a spanner until the bearing has been loosened. The inside ball-cup 52 is then rotated by means of a spanner inserted in the holes 533, 534, until the desired position of the bearing laterally is obtained, after which the outside ball-cup 53 is rotated until the proper adjustment of the balls in the bearings is obtained. A notch 522 in the outer ball-cup 53 is then brought opposite one of the notches 521 in the inside ball-cup, and the locking plate 54 is inserted. The bolt 55 may then be replaced, and the whole bearing is thereby secured so that there is no danger of the parts working loose. The bearing may be filled with grease in the usual manner through the hole 512.

What I claim is:

1. In a ball bearing for the connecting rod and crank-pin of an engine, the combination of a ball-track fast upon the crank-pin, balls therefor, a ball-cup threaded upon its peripheral surface and forming a cap over the end of the crank-pin and bearing, a second ball-cup similarly threaded upon its peripheral surface, both said ball-cups being provided with notches for the reception of a locking-plate, a locking-plate engaging the said notches and an interiorly threaded casing for the reception of the said ball-cups.

2. The improved ball bearing for the connecting rod and crank-pin of an engine comprising, essentially, a ball-track fast upon the crank-pin, balls therefor, an exterior ball-cup threaded upon its peripheral surface and forming a cap over the end of the crank-pin and bearing, an interior ball-cup next the crank, screw threaded upon its peripheral surface and forming a cap for the side of the bearing next the crank, said ball-cups having notches at convenient intervals extending transversely of the threaded peripheral surface, a bearing casing formed in the end of the connecting rod, screw threaded upon its interior surface for the reception of the said ball-cups, and having a slot therein for the reception of the locking piece, and a locking piece extending through a slot in the bearing casing and engaging the notches in the said ball-cups whereby the said ball-cups are prevented from rotation with relation to the connecting rod, substantially as described.

3. An improved ball bearing for the connecting rod of a crank-pin of an engine, comprising, essentially, a ball-track fast upon the crank-pin, balls therefor, ball-cups threaded upon their peripheral surface and provided with notches extending only part way across the said peripheral surface, a casing formed in the end of the connecting rod and threaded upon its interior surface for the reception of said ball-cups, and a locking plate provided with two prongs each of which engages a notch in one of the said ball-cups, whereby the said ball-cups are prevented from rotation relative to the connecting rod.

In testimony whereof I affix my signature, in presence of two witnesses.

WILLIAM B. MASON.

Witnesses:
 WM. A. MACLEOD,
 ALICE H. MORRISON.